(12) United States Patent
Chu

(10) Patent No.: US 11,658,591 B2
(45) Date of Patent: May 23, 2023

(54) MOTOR CONTROLLER

(71) Applicant: Global Mixed-mode Technology Inc., Hsin-Chu (TW)

(72) Inventor: Chien-Lun Chu, Hsinchu County (TW)

(73) Assignee: Global Mixed-mode Technology Inc., Hsin-Chu (TW)

( * ) Notice: Subject to any disclaimer, the term of this patent is extended or adjusted under 35 U.S.C. 154(b) by 215 days.

(21) Appl. No.: 17/105,612

(22) Filed: Nov. 26, 2020

(65) Prior Publication Data

US 2022/0166353 A1   May 26, 2022

(51) Int. Cl.
*H02P 6/28* (2016.01)
*H02P 7/29* (2016.01)

(52) U.S. Cl.
CPC . *H02P 6/28* (2016.02); *H02P 7/29* (2013.01)

(58) Field of Classification Search
CPC .................................... H02P 6/28; H02P 7/29
USPC ......................................................... 318/432
See application file for complete search history.

(56) References Cited

U.S. PATENT DOCUMENTS

| 9,787,241 | B2 | 10/2017 | Hirota |
| 10,164,556 | B2 | 12/2018 | Tsai |
| 10,658,903 | B2 | 5/2020 | Forster |
| 2007/0189739 | A1* | 8/2007 | Dufner ...................... H02P 6/28 388/801 |
| 2017/0025972 | A1* | 1/2017 | Tsai .......................... H02P 7/04 |

FOREIGN PATENT DOCUMENTS

| CN | 105429521 | A | | 3/2016 | |
| CN | 107078667 | A | * | 8/2017 | ............ H02P 27/085 |
| CN | 108075690 | A | | 5/2018 | |
| GB | 2515080 | A | * | 12/2014 | ................ H02P 6/15 |
| TW | 201705672 | A | | 2/2017 | |
| TW | 201724723 | A | * | 7/2017 | .............. H02P 27/08 |
| TW | 201724723 | A | | 7/2017 | |

* cited by examiner

*Primary Examiner* — Jorge L Carrasquillo
(74) *Attorney, Agent, or Firm* — Winston Hsu

(57) ABSTRACT

A motor controller is configured to stabilize the motor current. The motor controller is used for driving a motor. The motor controller comprises a switch circuit, a control unit, and a phase detecting unit. The phase detecting unit generates a phase signal to the control unit for switching phases. The phase signal sequentially generates a first, second, third, fourth, fifth and sixth time interval. The first to sixth time intervals correspond to first to sixth phases, respectively. The motor controller further comprises a first driving time for driving the motor in the fifth phase, where the first driving time is related to the first time interval. The motor controller further comprises a second driving time for driving the motor in the sixth phase, where the second driving time is related to the second time interval.

12 Claims, 3 Drawing Sheets

MOTOR CONTROLLER

BACKGROUND OF THE INVENTION

1. Field of the Invention

The present invention relates to a motor controller, and more particularly, to a motor controller which is capable of stabilizing the motor current.

2. Description of the Prior Art

Generally speaking, it is a goal to stabilize the motor current and the motor speed. The rotor of the motor may be divided into a plurality of pole regions. The motor controller may detect the plurality of pole regions for switching phases, so as to drive the motor. However, when the sizes of the plurality of pole regions differ due to a manufacturing tolerance, the prior-art method may increase the high-low ratio of the motor current in each phase and result in the unstable motor current.

Thus, what is needed is the motor controller which is capable of stabilizing the motor current.

SUMMARY OF THE INVENTION

According to the present invention, a motor controller which is capable of stabilizing a motor current is provided. The motor controller is used for driving a motor, where the motor has a motor coil and a rotor. The rotor comprises a first pole region, a second pole region, a third pole region, and a fourth pole region to switch phases. The motor coil has a first terminal and a second terminal. The motor controller comprises a switch circuit, a control unit, and a phase detecting unit. The switch circuit includes a first transistor, a second transistor, a third transistor, and a fourth transistor for supplying the motor current to the motor coil. The control unit generates a plurality of control signals to control the switch circuit. The phase detecting unit generates a phase signal to the control unit for switching phases, where the phase detecting unit may be a Hall sensing device or a back-electromotive force detecting circuit.

The phase signal sequentially generates a first time interval T01, a second time interval T02, a third time interval T03, a fourth time interval T04, a fifth time interval T05, a sixth time interval T06, a seventh time interval T07, and an eighth time interval T08. The first time interval T01 corresponds to a first phase and the first pole region. The second time interval T02 corresponds to a second phase and the second pole region. The third time interval T03 corresponds to a third phase and the third pole region. The fourth time interval T04 corresponds to a fourth phase and the fourth pole region. The fifth time interval T05 corresponds to a fifth phase and the first pole region. The sixth time interval T06 corresponds to a sixth phase and the second pole region. The seventh time interval T07 corresponds to a seventh phase and the third pole region. The eighth time interval T08 corresponds to an eighth phase and the fourth pole region. The motor controller enables the rotor to rotate 360 degrees for completing a first cycle during a first period by the phase signal, where the first period is equal to (T01+T02+T03+T04). Then the motor controller enables the rotor to rotate 360 degrees for completing a second cycle during a second period by the phase signal, where the second period is equal to (T05+T06+T07+T08). The control unit may record the first time interval T01, the second time interval T02, the third time interval T03, and the fourth time interval T04 for driving the motor to complete the second cycle. The control unit may record the fifth time interval T05, the sixth time interval T06, the seventh time interval T07, and the eighth time interval T08 for driving the motor to complete a third cycle.

The motor controller further comprises a first driving time for driving the motor in the fifth phase, where the first driving time is related to the first time interval T01. The motor controller further comprises a second driving time for driving the motor in the sixth phase, where the second driving time is related to the second time interval T02. The motor controller further comprises a third driving time for driving the motor in the seventh phase, where the third driving time is related to the third time interval T03. The motor controller further comprises a fourth driving time for driving the motor in the eighth phase, where the fourth driving time is related to the fourth time interval T04. That is to say, starting from the second cycle, the driving time of each phase is related to the time interval that corresponds to the previous cycle of the same pole region. Based on the above rule, the motor controller may stabilize the motor current and reduce the difference of the motor speed between the previous cycle and the subsequent cycle due to the asymmetrical pole regions.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The above-mentioned and other objects, features, and advantages of the present invention will become apparent with reference to the following descriptions and accompanying drawings, wherein.

DETAILED DESCRIPTION

Preferred embodiments according to the present invention will be described in detail with reference to the drawings.

Figure 1:
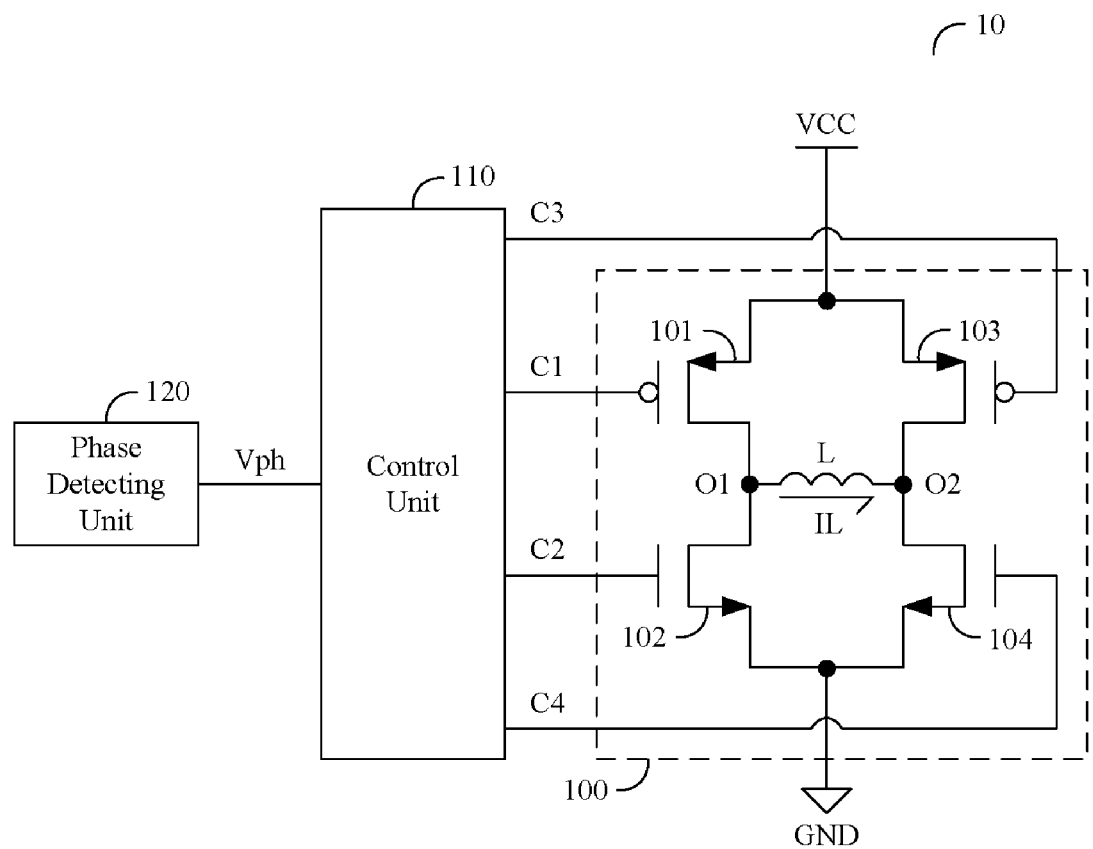
FIG. 1 is a schematic diagram showing a motor controller according to one embodiment of the present invention.
Figure 2:
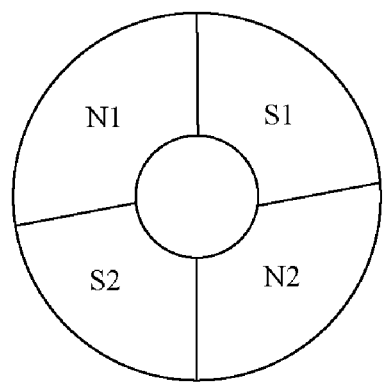
FIG. 2 is a schematic diagram showing a rotor according to one embodiment of the present invention.

FIG. 1 is a schematic diagram showing a motor controller 10 according to one embodiment of the present invention. The motor controller 10 is used for driving a motor, where the motor has a motor coil L and a rotor. FIG. 2 is a schematic diagram showing the rotor according to one embodiment of the present invention. The rotor comprises a first pole region N1, a second pole region S1, a third pole region N2, and a fourth pole region S2 to switch phases. In an ideal case, each of the size of the first pole region N1, the size of the second pole region S1, the size of third pole region N2, and the size of the fourth pole region S2 should be equal to a quarter of the rotor. As shown in FIG. 2, practically each of the size of the first pole region N1, the size of the second pole region S1, the size of third pole region N2, and the size of the fourth pole region S2 is not equal to a quarter of the rotor due to a manufacturing error.

The motor coil L has a first terminal O1 and a second terminal O2. The motor controller 10 comprises a switch circuit 100, a control unit 110, and a phase detecting unit 120. The switch circuit 100 includes a first transistor 101, a second transistor 102, a third transistor 103, and a fourth transistor 104 for supplying a motor current IL to the motor coil L. The first transistor 101 is coupled to a voltage source VCC and the first terminal O1 while the second transistor 102 is coupled to the first terminal O1 and a ground GND. The third transistor 103 is coupled to the voltage source VCC and the second terminal O2 while the fourth transistor 104 is coupled to the second terminal O2 and the ground GND. The first transistor 101, the second transistor 102, the third transistor 103, and the fourth transistor 104 may be respectively a p-type MOSFET or an n-type MOSFET. As shown in FIG. 1, each of the first transistor 101 and the third transistor 103 may be a p-type MOSFET, while each of the second transistor 102 and the fourth transistor 104 may be an n-type MOSFET.

The control unit 110 generates a first control signal C1, a second control signal C2, a third control signal C3, and a fourth control signal C4 so as to respectively control the ON/OFF states of the first transistor 101, the second transistor 102, the third transistor 103, and the fourth transistor 104. The phase detecting unit 120 generates a phase signal Vph to the control unit 110 for switching phases, where the phase detecting unit 120 may be a Hall sensing device or a back-electromotive force detecting circuit. For example, the Hall sensing device may be configured to detect the position change of the first pole region N1, the second pole region S1, the third pole region N2, and the fourth pole region S2 in the rotor, so as to generate the phase signal Vph. Thus, the current pole region of the rotor can be obtained by the phase signal Vph. The control unit 110 receives the phase signal Vph for driving the motor.

Figure 3:
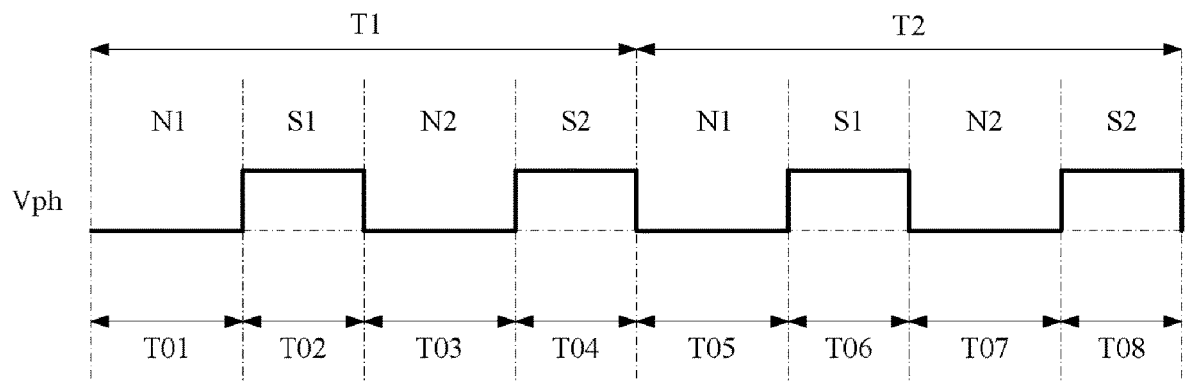
FIG. 3 is a timing chart according to one embodiment of the present invention.

FIG. 3 is a timing chart according to one embodiment of the present invention. The phase signal Vph sequentially generates a first time interval T01, a second time interval T02, a third time interval T03, a fourth time interval T04, a fifth time interval T05, a sixth time interval T06, a seventh time interval T07, and an eighth time interval T08. The first time interval T01 corresponds to a first phase and the first pole region N1. The second time interval T02 corresponds to a second phase and the second pole region S1. The third time interval T03 corresponds to a third phase and the third pole region N2. The fourth time interval T04 corresponds to a fourth phase and the fourth pole region S2. The fifth time interval T05 corresponds to a fifth phase and the first pole region N1. The sixth time interval T06 corresponds to a sixth phase and the second pole region S1. The seventh time interval T07 corresponds to a seventh phase and the third pole region N2. The eighth time interval T08 corresponds to an eighth phase and the fourth pole region S2. The motor controller 10 enables the rotor to rotate 360 degrees for completing a first cycle during a first period T1 by the phase signal Vph, where the first period T1 is equal to (T01+T02+T03+T04). Then the motor controller 10 enables the rotor to rotate 360 degrees for completing a second cycle during a second period T2 by the phase signal Vph, where the second period T2 is equal to (T05+T06+T07+T08). The control unit 110 may record the first time interval T01, the second time interval T02, the third time interval T03, and the fourth time interval T04 for driving the motor to complete the second cycle. The control unit 110 may record the fifth time interval T05, the sixth time interval T06, the seventh time interval T07, and the eighth time interval T08 for driving the motor to complete a third cycle.

More specifically, the motor controller 10 further comprises a first driving time for driving the motor in the fifth phase, where the first driving time is related to the first time interval T01. The motor controller 10 further comprises a second driving time for driving the motor in the sixth phase, where the second driving time is related to the second time interval T02. The motor controller 10 further comprises a third driving time for driving the motor in the seventh phase, where the third driving time is related to the third time interval T03. The motor controller 10 further comprises a fourth driving time for driving the motor in the eighth phase, where the fourth driving time is related to the fourth time interval T04. That is to say, starting from the second cycle, the driving time of each phase is related to the time interval that corresponds to the previous cycle of the same pole region. Based on the above rule, there are at least three embodiments which may stabilize the motor current IL and reduce the difference of the motor speed between the previous cycle and the subsequent cycle due to the asymmetrical pole regions as follows:

1. The first driving time is equal to T01. The second driving time is equal to T02. The third driving time is equal to T03. The fourth driving time is equal to T04. The subsequent driving time can be obtained by this embodiment as a result.

2. The first driving time is equal to (T01+T02+T03+T04)/4. The second driving time is equal to (T01+T02+T03+T04)/4. The third driving time is equal to (T01+T02+T03+T04)/4. The fourth driving time is equal to (T01+T02+T03+T04)/4. The subsequent driving time can be obtained by this embodiment as a result.

3. The first driving time is equal to (T01+T02+T03+T04)/4. The second driving time is equal to (T02+T03+T04+T05)/4. The third driving time is equal to (T03+T04+T05+T06)/4. The fourth driving time is equal to (T04+T05+T06+T07)/4. The subsequent driving time can be obtained by this embodiment as a result.

According to one embodiment of the present invention, the motor controller 10 can be applied to a single-phase configuration. When the motor controller 10 is operated in the $(M+1)^{th}$ cycle, the driving time in the phase of the first pole region N1 is related to the time interval corresponding to the first pole region N1 of the $M^{th}$ cycle, where M is a positive integer and M is greater than or equal to 1. When the motor controller 10 is operated in the (M+1)th cycle, the driving time in the phase of the second pole region S1 is related to the time interval corresponding to the second pole region S1 of the $M^{th}$ cycle. When the motor controller 10 is operated in the $(M+1)^{th}$ cycle, the driving time in the phase of the third pole region N2 is related to the time interval corresponding to the third pole region N2 of the $M^{th}$ cycle. When the motor controller 10 is operated in the $(M+1)^{th}$ cycle, the driving time in the phase of the fourth pole region S2 is related to the time interval corresponding to the fourth pole region S2 of the $M^{th}$ cycle. Thus, the motor controller 10 may decrease the high-low ratio of the motor current IL in each phase and reduce the difference of the motor speed between the $M^{th}$ cycle and the $(M+1)^{th}$ cycle.

While the present invention has been described by the preferred embodiment, it is to be understood that the invention is not limited to the disclosed embodiment. On the contrary, it is intended to cover various modifications. Therefore, the scope of the appended claims should be accorded the broadest interpretation so as to encompass all such modifications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A motor controller configured to drive a motor, wherein the motor has a motor coil and a rotor, the motor coil has a first terminal and a second terminal and the rotor comprises a first pole region, the motor controller comprising:
   a switch circuit, configured to supply a motor current to the motor coil;
   a control unit, configured to generate a plurality of control signals to control the switch circuit;
   a phase detecting unit, configured to generate a phase signal to the control unit, wherein the phase signal sequentially generates a first time interval (T01), a second time interval (T02), a third time interval (T03), a fourth time interval (T04), a fifth time interval (T05), and a sixth time interval (T06), the first time interval (T01) corresponds to a first phase, the second time interval (T02) corresponds to a second phase, the third time interval (T03) corresponds to a third phase, the fourth time interval (T04) corresponds to a fourth phase, the fifth time interval (T05) corresponds to a fifth phase, and the sixth time interval (T06) corresponds to a sixth phase; and
   a first driving time, configured to drive the motor in the fifth phase, wherein the first driving time is related to the first time interval (T01);
   wherein the control unit records the first time interval (T01), the second time interval (T02), the third time interval (T03), the fourth time interval (T04), the fifth time interval (T05), and the sixth time interval (T06);
   a driving time in a phase of the first pole region is related to a time interval corresponding to the first pole region of an Mth cycle, M is a positive integer, and M is greater than or equal to 1;
   wherein the motor controller is used for decreasing a high-low ratio of the motor current in the phase.

2. The motor controller of claim 1, wherein the first driving time is equal to T01.

3. The motor controller of claim 1, wherein the first driving time is equal to (T01+T02+T03+T04)/4.

4. The motor controller of claim 1, wherein the motor controller is applied to a single-phase configuration.

5. The motor controller of claim 1, wherein the switch circuit comprises: a first transistor, coupled to a voltage source and the first terminal; a second transistor, coupled to the first terminal and a ground; a third transistor, coupled to voltage source and the second terminal; and a fourth transistor, coupled to the second terminal and the ground.

6. The motor controller of claim 1, wherein the motor controller further comprises a second driving time, the second driving time is configured to drive the motor in the sixth phase, and the second driving time is related to the second time interval (T02).

7. The motor controller of claim 6, wherein the second driving time is equal to T02.

8. The motor controller of claim 6, wherein the second driving time is equal to (T01+T02+T03+T04)/4.

9. The motor controller of claim 6, wherein the second driving time is equal to (T02+T03+T04+T05)/4.

10. A motor controller configured to drive a motor, wherein the motor has a motor coil and a rotor, the rotor comprises a first pole region, and the motor controller comprising:
    a switch circuit, configured to supply a motor current to the motor coil;
    a control unit, configured to generate a plurality of control signals to control the switch circuit; and
    a phase detecting unit, configured to generate a phase signal to the control unit, wherein when the motor controller is operated in an $(m+1)^{th}$ cycle, a driving time in a phase of the first pole region is related to a first time interval (T01), a second time interval (T02), a third time interval (T03), a fourth time interval (T04), a fifth time interval (T05), and a sixth time interval (T06) corresponding to the first pole region of an $M^{th}$ cycle, M is a positive integer, and M is greater than or equal to 1;
    wherein the control unit records the first time interval (T01), the second time interval (T02), the third time interval (T03), the fourth time interval (T04), the fifth time interval (T05), and the sixth time interval (T06);
    wherein the motor controller is used for decreasing a high-low ratio of the motor current in the phase.

11. The motor controller of claim 10, wherein the motor controller is used for reducing the difference of a motor speed between the Mth cycle and the (M+1)th cycle.

12. The motor controller of claim 10, wherein the motor controller is applied to a single-phase configuration.

* * * * *